Aug. 1, 1944.    P. BATEMAN    2,354,645
FILTER
Filed March 3, 1941
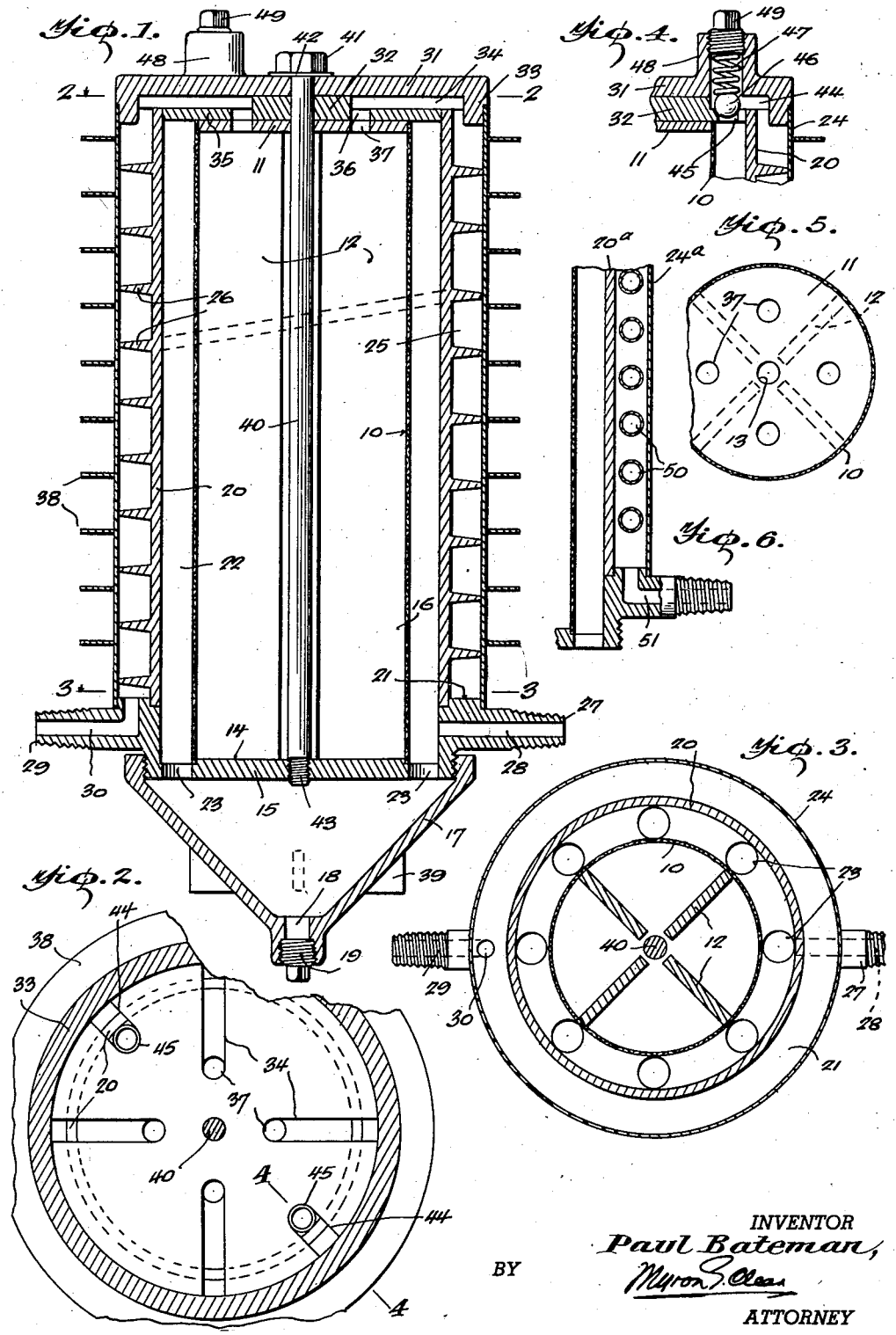
INVENTOR
Paul Bateman,
BY Myron S. Olear
ATTORNEY Patented Aug. 1, 1944

2,354,645

UNITED STATES PATENT OFFICE 2,354,645

FILTER

Paul Bateman, San Diego, Calif.

Application March 3, 1941, Serial No. 381,468

3 Claims. (Cl. 210—150.5)

The present invention relates generally to filters, and more particularly to a filter designed to be used in the flow line of lubricating oil and/or other fluids, for removing from the flowing fluid foreign materials to thus recondition the fluid to this extent for further use, and has for its primary object the provision of a practical, efficient apparatus of a simple, rugged character by which, among other things, temperature of the filtrate may be controlled in addition to its clarification, and a safety factor presented to insure continuous flow in the possible event of clogging of the filtering member.

In the accompanying drawing, illustrating the invention, and forming a part of this specification, Figure 1 is a vertical sectional view through a proposed construction embodying the invention.

Figures 2 and 3 are horizontal sectional views taken therethrough, respectively, on lines 2—2 and 3—3 of Figure 1.

Figure 4 is a detail, fragmentary sectional view vertically through a portion thereof, taken substantially on line 4—4 of Figure 2.

Figure 5 is a top plan view of the filtering cylinder, removed and partly broken away, and Figure 6 is a detail fragmentary vertical sectional view illustrating a slight modification of the temperature controlling means.

Referring to the above described figures, and particularly to Figure 1, there is shown an inner filtering member including a cylindrical foraminous or reticulate wall 10, within the upper end of which a circular top plate 11 is fixed horizontally on the upper ends of upright wall members 12 disposed radially with respect to the axis of the cylinder and spaced at their inner edges therefrom, below the axial opening 13 of the top plate, as seen in Figure 5.

The lower edge of the cylindrical filtering wall 10 seats around the centrally located raised portion 14 of a base plate or member 15 which closes the bottom of the filtrate chamber 16 formed within the filtering cylinder, and which has an externally threaded lower portion to receive the internally threaded upper end of an inverted conical sludge receiver 17. The lower smaller end of this tapering receiver has a discharge opening 18, normally closed by a screw plug 19.

Around, and spaced from the filtering cylinder, is a cylindrical casing 20 whose lower end is seated on an inner shoulder of an annular raised portion 21 of the base member 15 to form, between the said casing and the filtering cylinder 10, an annular space 22 for the reception of the fluid to be filtered. This receiving space is in communication at its lower end with the sludge receiver 17 through an annular series of openings 23 of the base member 15 as seen in Figures 1 and 3.

Around and spaced from the casing 20 is a cylindrical shell 24 which seats at its lower end on an outer shoulder of the annular raised portion 21 of the base 15 and forms between the same and the casing an annular cooling channel 25 for the filtrate which is helical by reason of a continuous helical rib 26 formed exteriorly on the casing and against which the shell 24 contacts.

The base member 15 has, at diametrically opposite points, an outstanding inlet fitting 27 whose channel 28 opens into the lower end of the receiving chamber 22 above the settling chamber of the sludge receiver 17, and an outlet fitting 29 whose channel 30 opens into the lower end of the filtrate cooling channel 25. These fittings are shown exteriorly threaded for convenient connection to receiving and return pipes (not shown).

At the upper end, a cover 31 seats on a cover plate 32, the latter resting on the top plate 11 of the filtering cylinder 10. The cover 31 has a depending peripheral flange 33 exteriorly of which is seated the upper end of the outer shell 24 and interiorly of which the upper portion of plate 32 engages so that its upper radial channels 34 communicate with the upper end of the filtrate cooling channel or space 25 at points between the upper end of the casing 20 and the cover flange 33.

The annularly reduced lower portion 35 of the cover plate 32 interfits the upper end of casing 20 and has openings 36 at the inner end of channels 34, in alinement with similar openings 37 through the filter top plate 11 so that the inner ends of said channels are thus in communication with the filtrate chamber within filter cylinder 10.

Briefly considering the operation, fluid to be filtered enters through the channel 28 of inlet fitting 27 into the lower portion of the receiving space 22 where it seeks passage through the filter screen or wall 10 into the inner filtrate space 16. The screen or wall 10 may be of suitable mesh for the work in hand to exclude from passage therethrough all foreign matter, the latter gradually falling into the sludge receiver 17 through openings 23.

The filtrate passes at the upper end of the inner space 16 through openings 37 and 36 and laterally through channels 34 to the upper end of the helical cooling channel 25 around the casing. In this channel the filtrate flows downwardly to the discharge or outlet fitting 29, in contact with the shell 24 subject to the tempering influence of external temperature, in this instance directly influencing the shell which has an external series of thin annular heat dissipating fins 38 and is itself formed with a thin wall for rapid dispersion of contained heat.

Thus the filtering and cooling form parts of a continuous operation during flow of fluid through the filter, and rejected foreign matter is gradually collected in the sludge receiving chamber where it may, from time to time, be drained by removing drain plug 19 without disturbing the continuity of operation.

Should the proper drainage of sludge be neglected and the sludge congest or harden in the receiver 17, the latter may be bodily removed from the base member 15 by reason of its threaded connection therewith, in order that it may be internally scraped and cleaned. For this purpose the receiver is shown with external fins 39 to insure effective finger or wrench grip.

The several cylindrical members of the filter are preferably clamped in position by a clamping bolt 40 depending through axial openings of cover 31 and cover plate 32, and the axial opening 13 of the top plate 11 of the filter cylinder. This bolt, which has an upper wrench head 41 seated on a sealing washer 42 atop the cover 31, extends axially through the filter cylinder and is threaded at 43 at its lower end into an axial opening of the base member 15.

Should neglect of the clearing of the sludge receiver 17, or any other reason, cause clogging of the filter cylinder and thus check continuous flow, it is provided, as seen in Figures 2 and 4, that unfiltered fluid may be by-passed from the receiving space 22 into the helical cooling channel 25. For this purpose the cover plate 32 has in its upper portion additional radial channels 44 as in Figures 2 and 4, opening at their outer ends into channel 25 and the lower portion 35 of said plate has openings 45 communicating between said channels and the fluid receiving space 22 within casing 20. These openings 45 form seats for ball valves 46 and are normally closed thereby. Valves 46 are held by springs 47 in bosses 48 of the cover 31 and threaded plugs 49 adjustable in said bosses serve to hold and vary effective pressure of the springs 47. The balls remain seated until pressure rises undesirably in the filter and open under such pressure to permit direct outflow of unfiltered fluid therefrom into the cooling channel.

The filter as a whole may be suitably supported in use, as for instance adjacent to the engine of a motor car, so that the outer heat dissipating shell 24 may have the benefit, more or less, of the motor fan to influence reduction of temperature of the filtrate. On the other hand it may be desirable to pass the filtrate from the channels 34 into, and through a pipe 50, as seen in Figure 6, arranged helically in the space between the casing and shell, here respectively indicated at 20ª and 24ª, to thus form a helical cooling channel and provide for circulation of cooling fluid through said space as by means of an upper inlet through the cover and a lower outlet through an outlet fitting 51. Since the pipe 50 is helical, the rib 26 need not be used. The cooling fins of the shell may also be dispensed with in this suggested modification.

The filter of the present invention has, due to the foregoing, the advantage of effectively removing foreign matter from the fluid to be filtered and cooling the filtrate in a continuous flow operation, in addition to the removal, normally and periodically, of collected foreign matter without disturbing the continuous operation.

Having thus fully described the invention, what is claimed is:

1. A continuous filter, comprising a casing including an upright imperforate wall and top and bottom members connected to the upper and lower ends of said wall, a screen member extending vertically and intermediately within said casing and in connection at its upper and lower ends, respectively, with said top and bottom members, said screen member being spaced from the casing wall and dividing the casing into a fluid receiving chamber at one side of the screen member between the same and the casing wall, and a filtrate chamber at the other side of the screen member, means forming a fluid inlet into the lower portion of said receiving chamber to initially project entering fluid directly against the screen member for passage through the latter into the filtrate chamber, a cooling shell spaced externally of the casing wall between said top and bottom members and forming therewith an external cooling chamber, means forming in the top member a transfer passage for screened fluid from the upper portion of the filtrate chamber into the upper portion of said cooling chamber, means forming a fluid outlet communicating with the lower portion of said cooling chamber, means in the top member and forming a fluid by-pass between the upper portions of the fluid receiving chamber and the cooling chamber, a valve normally closing said by-pass and opening under excessive pressure in the receiving chamber for direct flow of fluid therefrom to the cooling chamber, and a sludge receiver below the bottom member and in communication, through openings in the latter, with the lower portion of the receiving chamber.

2. A continuous filter comprising a cylindrical casing including an imperforate wall and top and bottom closure members connected to said wall, a cylindrical screen within the casing spaced from said wall and forming, with said top and bottom members, an inner filtrate chamber within the screen and an intermediate fluid receiving chamber around the screen and between the same and the casing wall, a shell surrounding the casing wall in spaced relation thereto and forming, with the top and bottom members, an outer fluid cooling chamber, means in the top member forming fluid transfer passages opening at their inner ends into the top of the inner filtrate chamber and opening at their outer ends into the top of the cooling chamber, means forming a fluid inlet into the lower portion of the receiving chamber, means forming a fluid outlet from the lower portion of the cooling chamber, said top member also having pressure relief ports opening at one end into the top of the receiving chamber and opening at their opposite ends into the top of the cooling chamber, whereby to by-pass the filtrate chamber, and valve members normally closing said relief ports and opening under excessive pressure in said receiving chamber.

3. A continuous filter comprising a cylindrical casing including an imperforate wall and top and bottom closure members, a cylindrical screen within said casing and closed at its bottom by said bottom member, an apertured plate in the top of said screen to thus form within the screen an inner filtrate chamber, the screen being spaced from the casing wall to form therebetween an intermediate fluid receiving space, a shell spaced around the casing wall and forming therein with the top and bottom members, an outer cooling chamber, a cover plate across the upper end of the casing and said receiving chamber beneath the top member, having fluid transfer passages opening at their inner ends into said apertures of the top plate of the screen and with the filtrate chamber, and opening at their outer ends into the upper end of the cooling chamber, means in connection with the bottom member of the casing forming a fluid inlet communicating with the lower portion of the receiving chamber, means also in connection with said bottom member forming a fluid outlet in communication with the lower portion of the cooling chamber, a sludge receiver below and connected to the bottom member, said bottom member having openings therethrough communicating between the lower portion of the receiving chamber and the said sludge receiver.

PAUL BATEMAN.